(12) United States Patent
Shen (10) Patent No.: US 12,322,867 B2
(45) Date of Patent: Jun. 3, 2025

(54) SHARED TRANSMIT AND RECEIVE APERTURE LINEAR ARRAY

(71) Applicant: Hughes Network Systems, LLC, Germantown, MD (US)

(72) Inventor: Junyu Shen, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 542 days.

(21) Appl. No.: 17/444,764

(22) Filed: Aug. 10, 2021

(65) Prior Publication Data

US 2023/0045792 A1    Feb. 16, 2023

(51) Int. Cl.
| | | |
|---|---|---|
| *H01Q 21/08* | (2006.01) | |
| *H01Q 9/04* | (2006.01) | |
| *H01Q 19/10* | (2006.01) | |
| *H04B 7/185* | (2006.01) | |
| *H04B 7/19* | (2006.01) | |

(52) U.S. Cl.
CPC ........... *H01Q 21/08* (2013.01); *H01Q 9/0407* (2013.01); *H01Q 19/10* (2013.01); *H04B 7/18513* (2013.01); *H04B 7/18517* (2013.01); *H04B 7/19* (2013.01)

(58) Field of Classification Search
CPC ...... H01Q 1/246; H01Q 19/10; H01Q 21/065; H01Q 21/30; H01Q 21/08
See application file for complete search history.

(56) References Cited

U.S. PATENT DOCUMENTS

| | | | | |
|---|---|---|---|---|
| 7,102,571 | B2 * | 9/2006 | McCarrick | H01Q 9/0414 |
| | | | | 343/700 MS |
| 11,031,700 | B2 * | 6/2021 | Ariumi | H01Q 23/00 |
| 2004/0080455 | A1 * | 4/2004 | Lee | H01Q 21/065 |
| | | | | 343/700 MS |
| 2008/0117114 | A1 * | 5/2008 | Haziza | H01Q 13/00 |
| | | | | 343/786 |
| 2010/0090902 | A1 | 4/2010 | Thompson et al. | |
| 2011/0063179 | A1 | 3/2011 | Guler | |
| 2015/0372397 | A1 * | 12/2015 | Jonsson | H01Q 1/246 |
| | | | | 343/835 |
| 2018/0241135 | A1 * | 8/2018 | Furlan | H01Q 21/0075 |
| 2019/0036231 | A1 | 1/2019 | Ryu et al. | |

(Continued)

FOREIGN PATENT DOCUMENTS

JP            61157105 A      7/1986

OTHER PUBLICATIONS

International Search Report and Written Opinion for PCT/US2022/039557 mailed Nov. 16, 2022, all pages.

(Continued)

*Primary Examiner* — Hasan Islam
(74) *Attorney, Agent, or Firm* — Kilpatrick Townsend & Stockton LLP (57) ABSTRACT

Various arrangements of transmit and receive shared-aperture array antenna systems are presented herein. The arrangements can include an antenna that includes: a planar substrate; a first row of a first plurality of transmit patches arranged on the planar substrate; a second row of a plurality of receive patches arranged on the planar substrate; and a third row of a second plurality of transmit patches arranged on the planar substrate. The first row, second row, and third row can be parallel and the second row can be between the first row and the third row.

14 Claims, 7 Drawing Sheets

(56) References Cited

U.S. PATENT DOCUMENTS

| | | | |
|---|---|---|---|
| 2019/0140362 A1 | 5/2019 | Edenfield et al. | |
| 2019/0393729 A1* | 12/2019 | Contopanagos | H01Q 21/24 |
| 2020/0303833 A1 | 9/2020 | Ueda | |
| 2021/0029556 A1* | 1/2021 | Wu | H01Q 19/106 |
| 2021/0143548 A1* | 5/2021 | Chivukula | H01Q 1/48 |
| 2024/0072420 A1* | 2/2024 | Hou | H01Q 15/14 |

OTHER PUBLICATIONS

M. Cooley, "Phased Array Fed Reflector (PAFR) Antenna Architectures for Space-Based Sensors," 2015 *IEEE Aerospace Conference*, 2015, pp. 1-11, doi: 10.1109/AERO.2015.7118963.

S. Liu et al., "A Dual-Band Shared Aperture Antenna Array in Ku/Ka-Bands for Beam Scanning Applications," in *IEEE Access*, vol. 7, pp. 78794-78802, 2019.

A. I. Sandhu, E. Arnieri, G. Amendola, L. Boccia, E. Meniconi and V. Ziegler, "Radiating Elements for Shared Aperture Tx/Rx Phased Arrays at K/Ka Band," in *IEEE Transactions on Antennas and Propagation*, vol. 64, No. 6, pp. 2270-2282, Jun. 2016.

* cited by examiner

SHARED TRANSMIT AND RECEIVE APERTURE LINEAR ARRAY

BACKGROUND

Antenna systems that simultaneously receive and transmit on different frequencies can have interference issues. For example, if separate transmit and receive elements are used, signal output by transmit elements may couple to adjacent receive elements if the elements are not sufficiently spaced. However, increased spacing can cause a size of an antenna system to be larger than is desired for various applications.

SUMMARY

Various embodiments are described related to a transmit and receive shared-aperture array antenna system. In some embodiments, a transmit and receive shared-aperture array antenna system is described. The system may comprise a planar substrate. The system may comprise a first row of a first plurality of transmit patches arranged on the planar substrate. The system may comprise a second row of a plurality of receive patches arranged on the planar substrate. The system may comprise a third row of a second plurality of transmit patches arranged on the planar substrate. The first row, second row, and third row may be parallel. The second row may be between the first row and the third row. Patches of the first plurality of transmit patches and the second plurality of transmit patches and each larger than patches of the plurality of receive patches.

Embodiments of such a system may include one or more of the following features: the system may further comprise a cylindrical reflector. The cylindrical reflector may be mechanically adjustable in a single, first dimension. The system may further comprise a phase shifter connected with the antenna such that a beam pattern may be electronically steerable in a second dimension perpendicular to the first dimension. The antenna may consist of a total of three rows, the three rows being the first row, the second row, and the third row. A center point of a first receive patch may be at a center point of a circle that may pass through two adjacent transmit patches of the first plurality of transmit patches and two adjacent transmit patches of the second plurality of transmit patches. The plurality of receive patches may be sized and positioned to optimally receive signals in the K-band and the first plurality of transmit patches and the second plurality of transmit patches may be sized and positioned to optimally transmit signals in the Ka-band. The system may further comprise a first plurality of feed points for the first plurality of transmit patches. The system may further comprise a second plurality of feed points for the plurality of receive patches. The system may further comprise a third plurality of feed points for the second plurality of transmit patches may be arranged such that the antenna transmits and receives circularly-polarized or dual-polarized signals. The antenna may be incorporated as part of an IoT ground terminal that may use the antenna to communicate with a geosynchronous satellite. The antenna may include nine receive elements or less. A gain of the antenna with the cylindrical reflector may be at least +20 dBi. An antenna beam may be steerable in the second dimension by +/−30 degrees with less than a 3 dB loss. The first row and third row may use a sequential rotation feeding scheme. The second row may use a half sequential rotation feeding scheme.

In some embodiments, a transmit and receive shared-aperture array antenna system is described. The system may comprise a cylindrical reflector. The system may comprise an antenna. The antenna may comprise a planar substrate. The antenna may comprise a first row of a first plurality of transmit patches arranged on the planar substrate. The antenna may comprise a second row of a plurality of receive patches arranged on the planar substrate. The antenna may comprise a third row of a second plurality of transmit patches arranged on the planar substrate. The first row, second row, and third row may be parallel. The second row may be between the first row and the third row. Patches of the first plurality of transmit patches and the second plurality of transmit patches and each larger than patches of the plurality of receive patches. The first row and third row may use a sequential rotation feeding scheme. Embodiments of such a system may include one or more of the following features: the second row uses a half sequential rotation feeding scheme.

In some embodiments, a method for using a transmit and receive shared-aperture array antenna system. The method may comprise mechanically aligning a cylindrical reflector to steer transmit and receive beams of an antenna along a first axis. The method may comprise electronically steering the transmit and the receive beams of the antenna along a second axis. The antenna may comprise a planar substrate. The antenna may comprise a first row of a first plurality of transmit patches arranged on the planar substrate. The antenna may comprise a second row of a plurality of receive patches arranged on the planar substrate. The antenna may comprise a third row of a second plurality of transmit patches arranged on the planar substrate. The first row, second row, and third row may be parallel. The second row may be between the first row and the third row. Patches of the first plurality of transmit patches and the second plurality of transmit patches and each larger than patches of the plurality of may receive patches. Communicating with a satellite may use the antenna. The first row and third row may use a sequential rotation feeding scheme. The second row uses a half sequential rotation feeding scheme. Communicating with the satellite may comprise transmitting data to and receiving data from a geosynchronous satellite.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Embodiments for a shared aperture transmit and receive linear antenna are described herein. Such embodiments can be optimized for circular polarization and dual polarization. By using a shared aperture, the overall size and weight of the antenna and antenna system can be decreased. As detailed herein, by interleaving two outer rows for a first purpose (e.g., transmitting) and a single row for another purpose (e.g., receiving), coincided focal points can be maintained. For the two outer rows, whichever purpose (transmitting or receiving) uses the higher frequency may be used. Therefore, if transmitting occurs at a higher frequency than receiving, the outer two rows are used for transmitting and the inner row is used for receiving. Further, in order to optimize the antenna for transmitting and receiving circular polarized signals, a combination feed approach can be used in which the two outer rows use a sequential rotation feeding scheme and the inner row uses a half-sectional sequential rotation feeding scheme.

Further, to increase the gain and directionality of the antenna beam for both transmitting and receiving, the antenna may be paired with a cylindrical reflector. In some embodiments, the cylindrical reflector is mounted in an offset arrangement with the antenna. The cylindrical reflector may be mechanically steered along a first axis (either by a motor or manually) and the antenna beam may be electronically steered (by adjusting the phase of transmitted and received signals) along a second axis perpendicular to the first axis. In other embodiments, without the use of a reflector, the linear antenna can be electronically scanned along a single axis.

Figure 1:
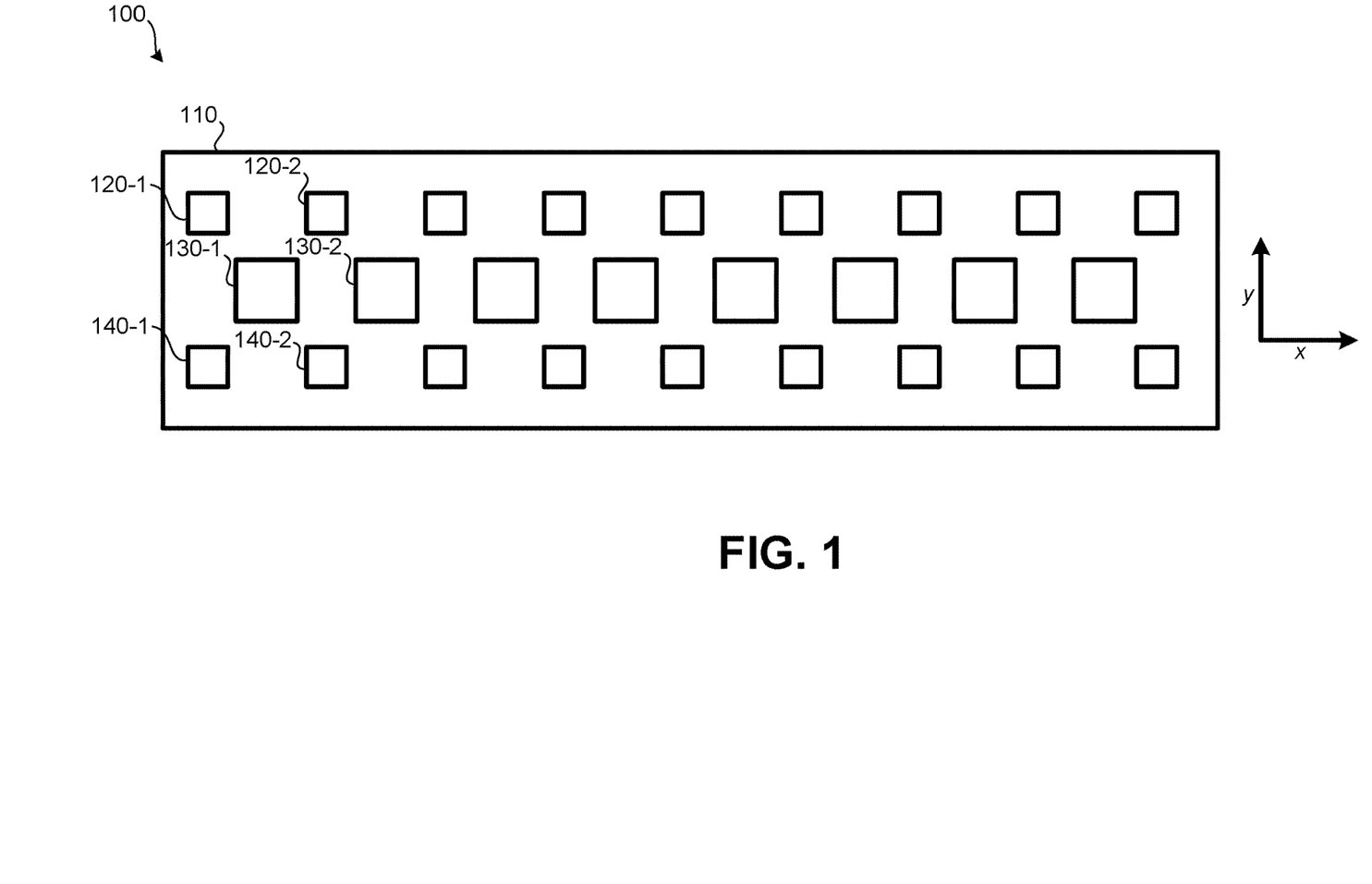
FIG. 1 illustrates an embodiment of a transmit and receive shared-aperture array antenna.

Further detail regarding these and other embodiments are provided in relation to the figures. FIG. 1 illustrates an embodiment of a transmit and receive shared-aperture array antenna 100 ("antenna 100"). Antenna 100 can include: substrate 110; transmit elements 120; receive elements 130; and transmit elements 140. Antenna elements may also be referred to as patches herein.

Figure 2:
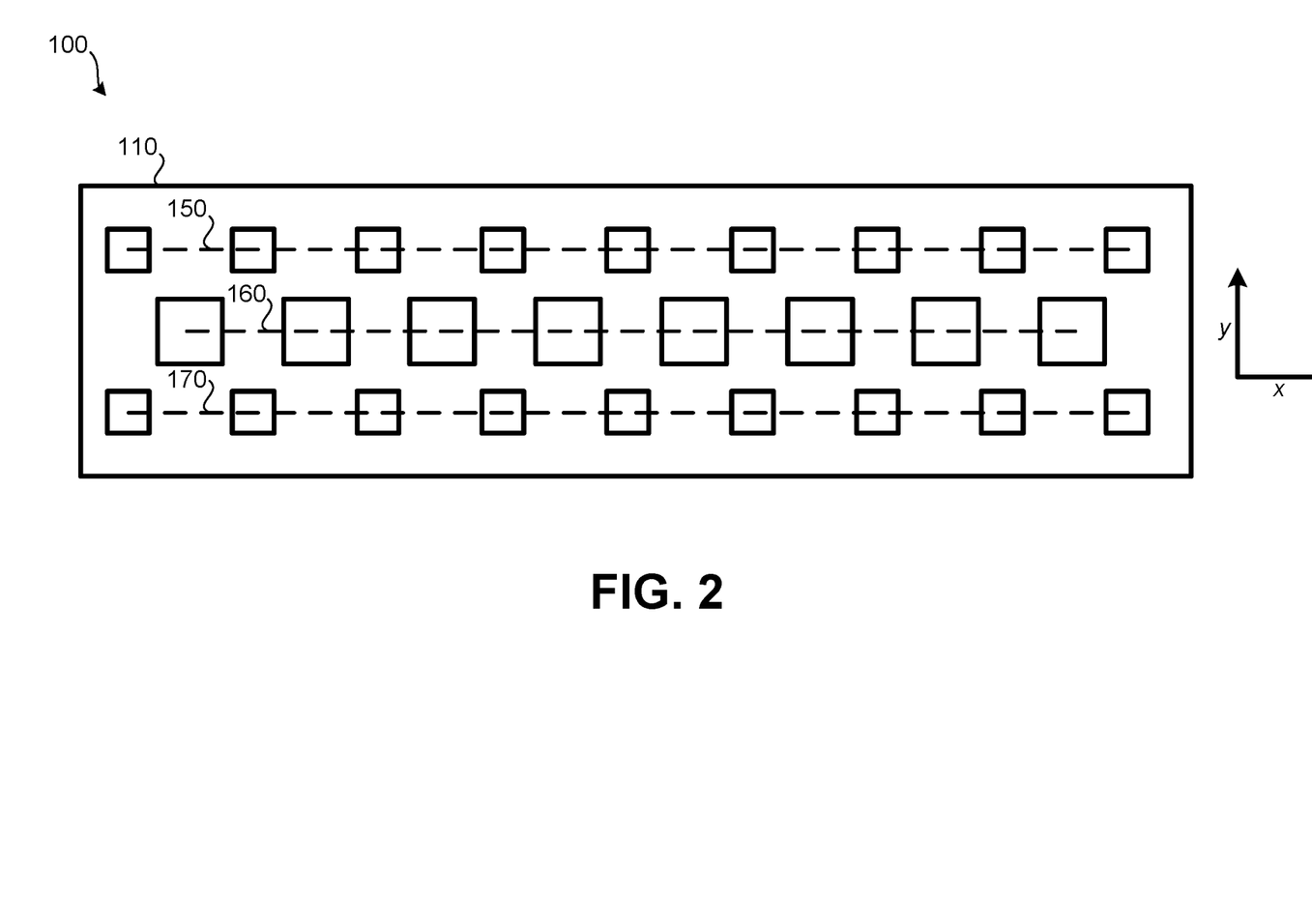
FIG. 2 illustrates an embodiment of a transmit and receive shared-aperture array antenna indicating rows along an axis.

Substrate 110 may create a generally planar surface on which elements 120, 130, and 140 are attached. In the embodiment of FIG. 1, antenna 100 is used to transmit signals at a higher frequency than at which antenna 100 is used to receive signals. A first row 150, as illustrated in FIG. 2, of transmit elements 120, and a second row 170 of transmit elements 140 are used to transmit circularly-polarized signals or dual polarized signals using linear polarization. In row 150, a number of elements, such as nine elements, are aligned along the x-axis. In other embodiments, fewer or greater number of elements can be present in row 150. Rows 150, 160, and 170 are present on a same layer of substrate 110. As illustrated in FIG. 1, row 150 includes elements 120-1, 120-2, and additional elements. Row 170 can include the same number of elements as row 150, is parallel to row 150, and is, therefore, also aligned along the x-axis. The size of elements 120 and 140 can be optimized for transmitting at a particular frequency or within a particular frequency band. For example, transmitting may occur in the Ka band (28-30 GHz). The sizing of elements 120 can be adjusted for other frequency bands. In some satellite communication systems, the ratio between transmit and receive center frequencies is 1.5:1. For example, such a frequency relationship may be present in the Ka transmit/K receive embodiments detailed herein.

Row 160 of receive elements 130 can be used to receive circularly-polarized signals, which can have the same or opposite circular polarization as the transmit signals. Row 160 is located between row 150 and row 170, is parallel with rows 150 and rows 170, and is equidistant from rows 150 and 170. In FIG. 2, two elements, element 130-1 and element 130-2 of row 160 are labelled, but a greater number of elements are present. For example, row 160 can include eight elements.

The size of elements 130 of row 160 may be larger than the size of elements of rows 150 and 170 since row 160 is optimized to receive signals at a lower frequency compared to the frequency at which signals are transmitted using elements 120 and 140. Elements 130, in some embodiments, are optimized to receive signals in the K band (18-20 GHz). The sizing of elements 130 can be adjusted for other frequency bands.

Notably, in other embodiments, rows 150 and 170 may be used to receive signals and row 160 may be used to transmit signals. In such embodiments, signals are received at a higher frequency than at which signals are transmitted.

Figure 3:
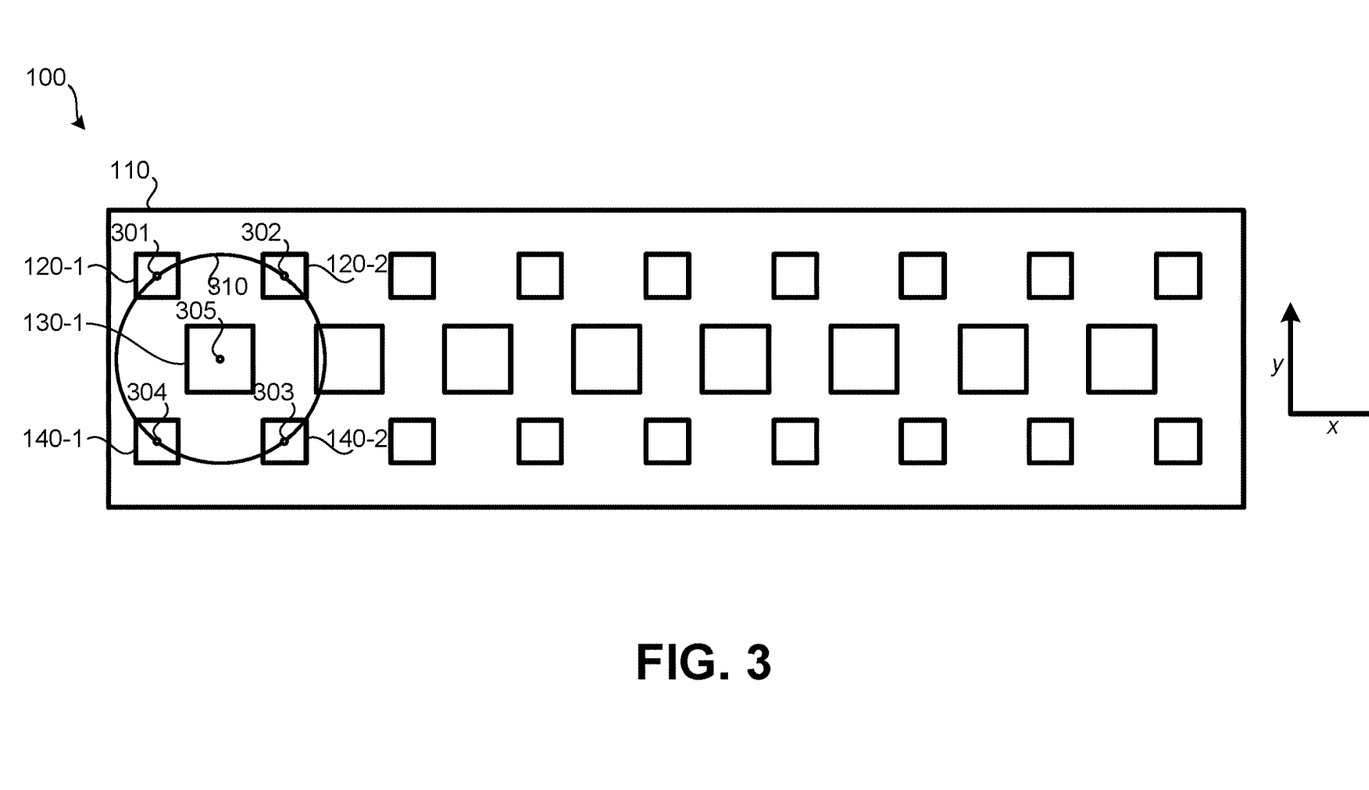
FIG. 3 illustrates an embodiment of a transmit and receive shared-aperture array antenna indicating an offset between transmit and receive patches.

Along the x-axis, elements 130 may be offset from elements 120 and 140. Referring to FIG. 3, focus 305 of circle 310 may be the same as the center point of receive element 130-1. A circle drawn around focus 305 may pass through center points 301, 302, 303, and 304 of elements 120-1, 120-2, 140-2, and 140-1, respectively. Therefore, circle 310 passes through center points of adjacent elements 120-1 and 120-2, and passes through center points of adjacent elements 140-1 and 140-2. Stated another way, row 160 can be 50% offset from rows 150 and 170 along the x-axis. Along the y-axis, there may be no overlap between elements in row 160 with elements of rows 150 and 170.

Antenna 100 may be used for transmitting and receiving signals with a satellite, such as a satellite in geosynchronous orbit. In some embodiments, antenna 100 can be incorporated as part of an Internet of Things (IoT) device, such as a sensor, sensor hub, computing device, or relatively low-bandwidth access point (AP). In order to keep cost and/or size down, only a total of three rows of elements may be used. Further, the total number of elements in rows 150 and 170 may be between 7 and 9 (inclusive), and the total of elements in row 160 may be eight. The arrangement of antenna 100 can provide above a 10% fractional impedance bandwidth for both receive and transmit.

Figure 4:
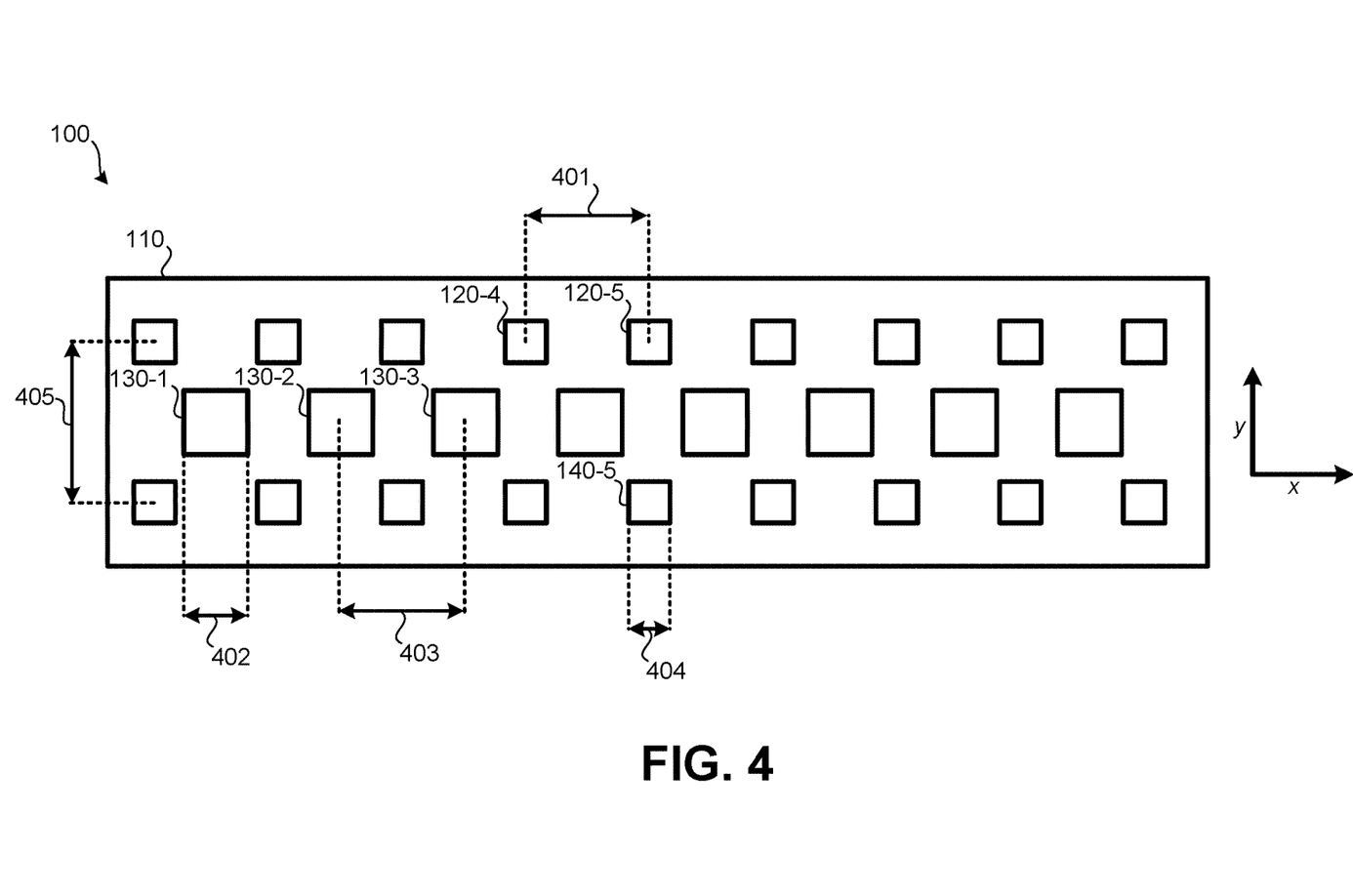
FIG. 4 illustrates an embodiment of a transmit and receive shared-aperture array antenna system with dimensions.

FIG. 4 illustrates possible dimensions for antenna 100. FIG. 4 is not a scale drawing. The dimensions of FIG. 4 are possible examples of an embodiment of antenna 100 that is optimized for transmitting in the Ka band and for receiving in the K band. In the embodiment of FIG. 4, each element may be square in shape; however, in other embodiments, other shapes, such as circular, a square ring, or a circular ring, may be used. The sides of each of elements 120 and 140 may be between 2 and 2.4 mm (e.g., 2.26 mm) as indicated by dimension 404. The distance between center points of adjacent elements in rows 150 and 170 may be consistent and may be a distance between 7 and 8 mm (e.g., 7.43 mm) as indicated by dimension 401. Elements in rows 150 and 170 that are aligned along the y-axis, as indicated by dimension 405, may be between 9.5 mm and 10.5 mm apart (e.g., 10.0 mm). For row 160, the distance between center points of adjacent elements may be consistent and may be a distance between 7 and 8 mm (e.g., 7.43 mm), as indicated by dimension 403. Dimension 403 and dimension 401 can be the same distance. Each element in row 160 can be square and each side may be between 4 and 5 mm in length (e.g., 4.17 mm), as indicated by dimension 402.

Dimension 401 and 403 may be regarded as an important dimension to optimize based on the transmit and receive bands to be used. As a second example, for a Ku-band implementation that receives between 10.7 GHz and 12.75 GHz and transmits between 12.75 GHz and 14.5 GHz, dimensions 401 and 403 could be set to 10 mm (or, more generally, between 9 mm and 11 mm).

In some embodiments, substrate 110 is used to form two (or more) layers. On a second layer, located below the top layer of FIG. 4, the dimensions of individual elements may be increased. For example, dimension 402 may be increased by between 5% and 9%, such as to 4.47 mm. Dimension 404 may be increased between 10% and 20%, such as to 2.67 mm. Each layer may be between 0.5 mm and 1 mm in thickness, such as 0.79 mm. A dielectric constant of between 2 and 2.5 may be used, such as 2.2.

Figure 5:
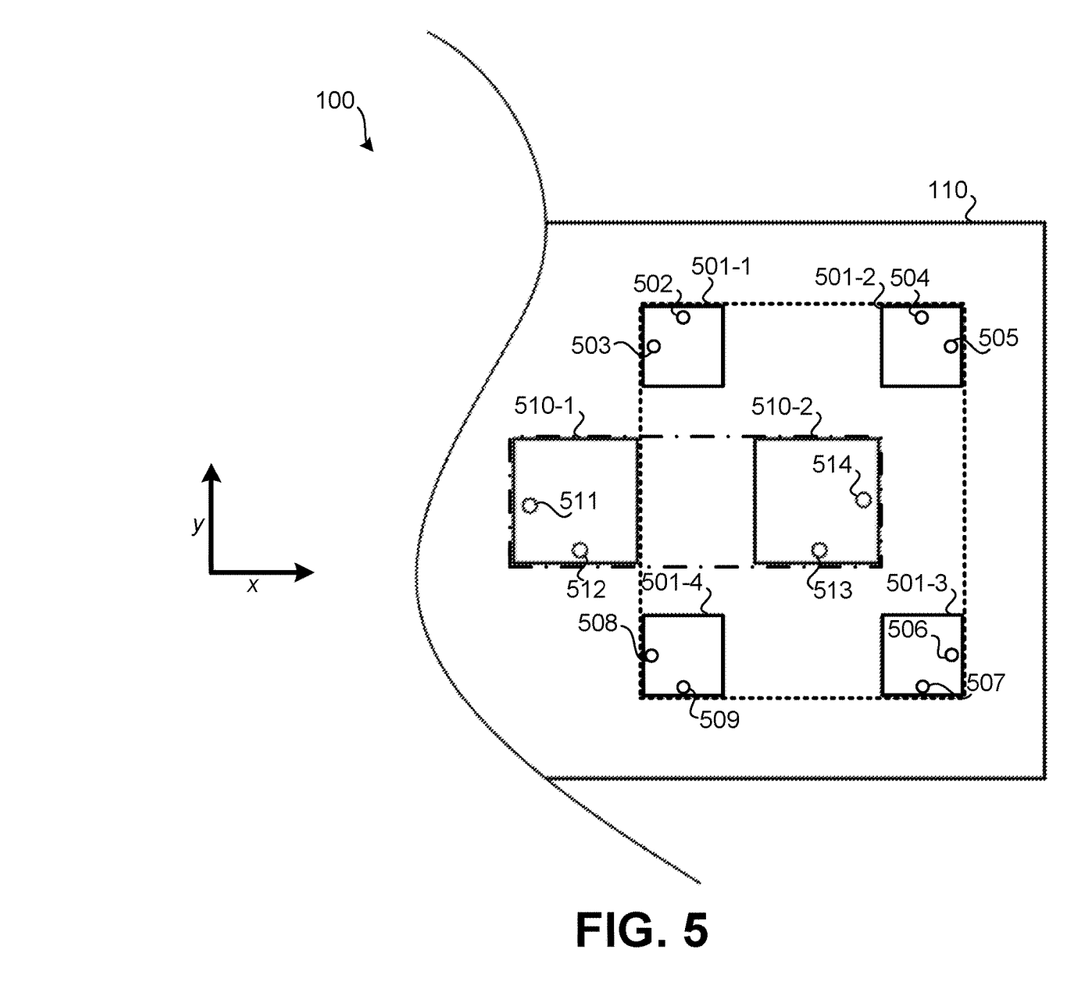
FIG. 5 illustrates an embodiment of a portion of a transmit and receive shared-aperture array antenna system with feed points indicated on some elements of the antenna.

FIG. 5 illustrates an embodiment of a transmit and receive shared-aperture array antenna system with feed points indicated on some elements of the antenna. For two layer antennas, the feed points can be located on the lower layer element. The locations of feed points in each of rows 150, 160, and 170 can be varied based on whether left-hand or right-hand polarization is desired to be transmitted or received. Embodiments can involve transmitting and receiving using the same circular polarizations or opposite polarizations.

Each element on antenna 100 can have two feed points, which are connected with a signal source (for transmitting) or a signal receiver (for receiving). A different feed phase relationship may be present for rows 150 and 170 compared with row 160. For rows 150 and 170, a sequential rotation feeding scheme may be used. Therefore, the phases for elements 501 (501-1, 501-2, 501-3, and 501-4) may be defined in concert. For example, this can involve: a phase of 270° being used at feed point 502; a phase of 180° being used at feed point 503; a phase of 270° being used at feed point 504; a phase of 0° being used at feed point 505; a phase of 0° being used at feed point 506; a phase of 90° being used at feed point 507; a phase of 180° being used at feed point 508; and a phase of 90° being used at feed point 509. For individual feed elements, one feed point may be centered along the element's y-axis, while the other element is centered along the element's x-axis.

For row 160, rather than using a sequential rotation feeding scheme, a half-section sequential rotation feeding scheme can be used. For example, this can involve: a phase of 180° being used at feed point 511; a phase of 90° being used at feed point 512; a phase of 90° being used at feed point 507; and a phase of 0° being used at feed point 506. While only a portion of antenna 100 is illustrated, these schemes for the arrangement of feed points can be continued for the remaining elements of antenna 100.

FIG. 5 is not to scale. For each element, a first feed point (e.g., feed point 514 on element 510-2) may be aligned on the y-axis with the center point of the element and a second feed point (e.g., feed point 513 on element 5102) may be aligned on the x-axis with the center point. For example, feed point 514 may be located 1.34 mm away from the center point of element 510-2 and feed point 513 may be located 1.67 mm away from the center point of element 510-2. While the orientation of feed points for elements in row 160 may vary, the distances from the center points of the elements may remain the same. For rows 150 and 170, using element 501-1 as an example, feed point 502 may be 0.76 mm from the center point of element 501-1 along the y-axis and feed point 503 may be 0.87 mm along the x-axis from the center point of element 501-1.

Figure 6:
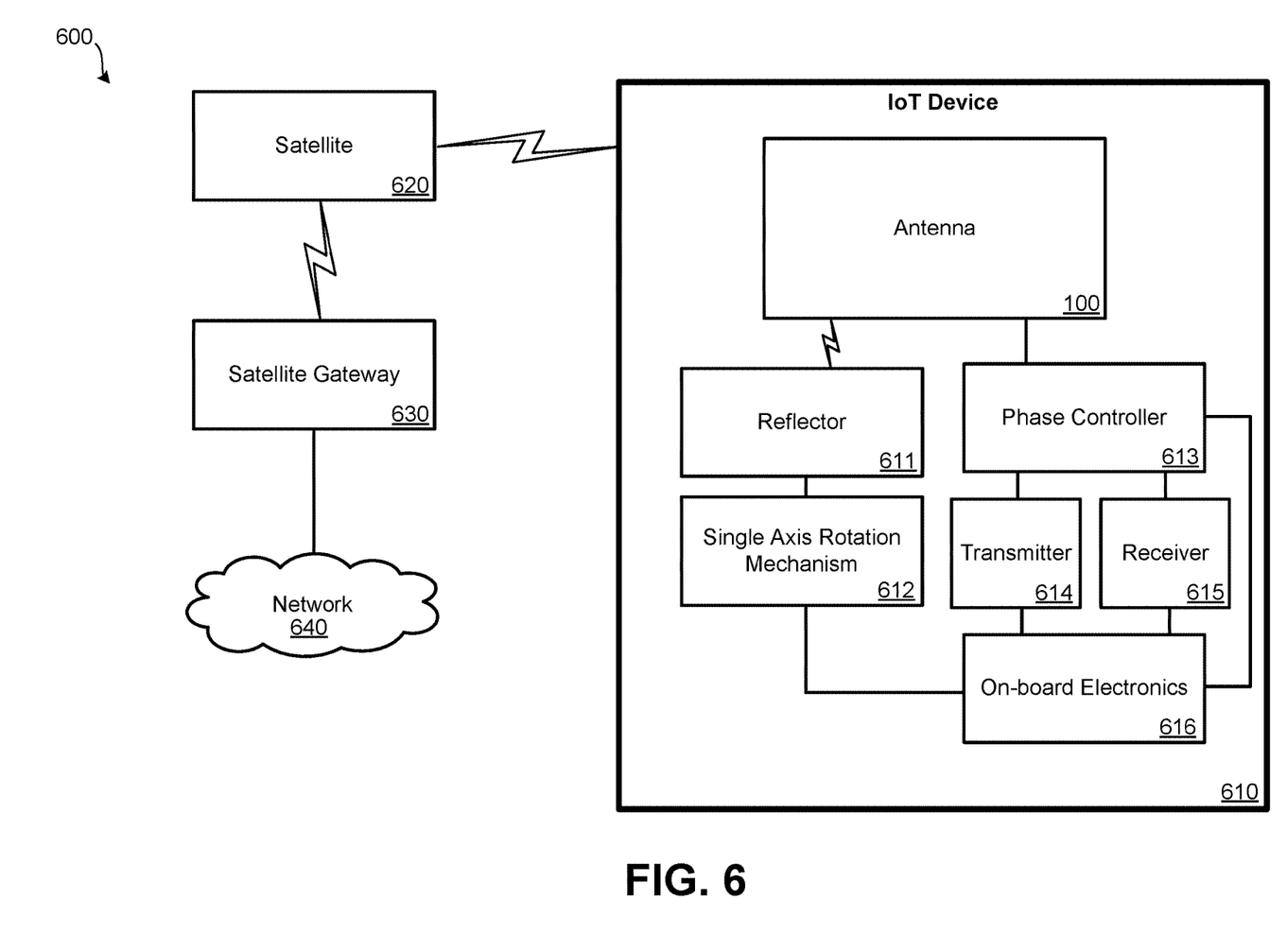
FIG. 6 illustrates a block diagram of an embodiment of a transmit and receive shared-aperture array antenna system.

FIG. 6 illustrates an embodiment of a block diagram of a transmit and receive shared-aperture array antenna system 600 ("system 600"). System 600 illustrates antenna 100 incorporated as part of IoT device 610. IoT device 610 can be a sensor device that communicates with network 640 via satellite 620. In some embodiments, IoT device 610 may instead be an access point or some other form of computerized device. IoT device 610 can include: antenna 100; reflector 611; single-axis rotation mechanism 612; phase controller 613; transmitter 614; receiver 615; and on-board electronics 616. In some embodiments, antenna 100 may be physically distinct from IoT device 610, such as connected by a wire. Further, antenna 100 may be incorporated as part of (or connected with) some other form of electronic device.

Reflector 611 may be a cylindrical reflector or some other style reflector that increases the gain of antenna 100, increase directionality, and/or helps decrease antenna side lobes. Reflector 611 may be an offset reflector. Reflector 611 may be steered along a single axis using single-axis rotation mechanism 612. Single-axis rotation mechanism 612 may be motorized or manually moved. Referring to FIG. 1, the antenna beam pattern may be electronically steerable along the x-axis. Steering along the x-axis may allow for +/−30 degrees of adjustment with less than a 3 dB loss. In other embodiments, scanning may be performed +/−45 degrees by using different design values. Single-axis rotation mechanism 612 may allow for steering along the y-axis.

Phase controller 613 may electronically adjust the direction of the antenna beam along the x-axis (which can be controlled independently for transmit and receive) by adjusting the phase of signals received from transmitter 614 and output to elements of antenna 100 and by adjusting the phase of signals received from elements of antenna 100 and output to receiver 615.

On-board electronics 616 can include a processing system, sensors, or any form of electronics that use antenna 100 to communicate with satellite 620. On-board electronics 616 may control the direction of the antenna beam patterns using phase controller 613 and single-axis rotation mechanism.

IoT device 610, via antenna 100, may have bidirectional communication with satellite 620. Satellite 620 can be in low earth orbit (LEO), middle earth orbit (MEO), or geosynchronous orbit (GEO). Specifically, antenna 100, when paired with cylindrical reflector 611, may have sufficient gain, such as +20 dB gain or greater (e.g., +25 dB) to communicate with a GEO satellite.

Satellite 620 may serve to relay communications between satellite gateway 630 and IoT device 610. Satellite gateway 630 can serve as a connection to various networks, both public and private. For example, a public network could be the Internet.

Figure 7:
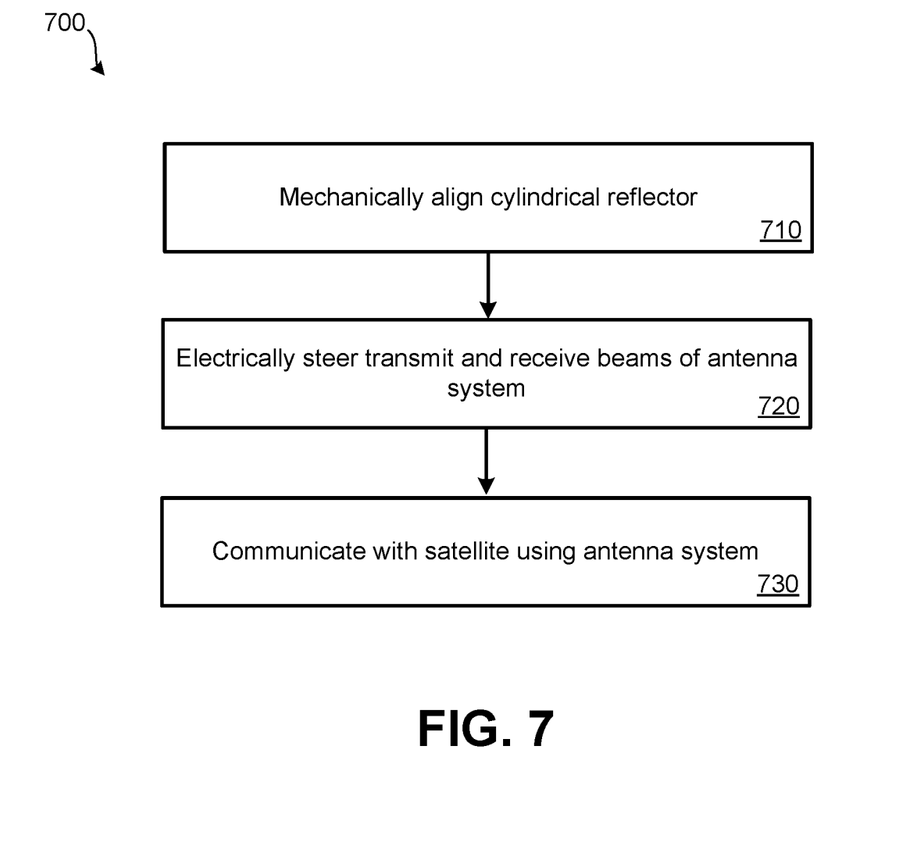
FIG. 7 illustrates an embodiment of a method for using a transmit and receive shared-aperture array antenna system.

Various methods may be performed using embodiments of antenna 100 and system 600. FIG. 7 illustrates an embodiment of a method 700 for using a transmit and receive shared-aperture array antenna system. At block 710, a cylindrical reflector may first be aligned in an attempt to aim antenna 100 along a first axis with a satellite (or other system with which bidirectional communication will occur). Block 710 may be performed via a motorized control of the cylindrical reflector or via manual adjustment.

At block 720, along an axis perpendicular to the axis along with the cylindrical reflector was adjusted, the transmit and receive beams of the antenna may be electronically adjusted by altering the phase of signals to be transmitted and signals to be received. In some embodiments, blocks 710 and 720 may be performed repeatedly to fine-tune the direction in which the receive and transmit beams are aimed in an attempt to optimally aim at the satellite or other system with which bidirectional communication will occur.

Once the antenna beam is aligned with the system with which communication will occur, such as a satellite, communication may occur at block 730. Such communication can involve circularly-polarized signals being transmitted and received.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A transmit and receive shared-aperture array antenna system, comprising:
    a cylindrical reflector mechanically adjustable in a single, first dimension;
    an antenna, comprising:
        a planar substrate;
        a first row of a first plurality of transmit patches arranged on the planar substrate;
        a second row of a plurality of receive patches arranged on the planar substrate; and
        a third row of a second plurality of transmit patches arranged on the planar substrate, wherein:
            the first row, second row, and third row are parallel;
            the second row is between the first row and the third row; and
        a phase shifter connected with the antenna such that a beam pattern is electronically steerable in a second dimension perpendicular to the first dimension.

2. The transmit and receive shared-aperture array antenna system of claim 1, wherein the antenna consists of a total of three rows, the three rows being the first row, the second row, and the third row.

3. The transmit and receive shared-aperture array antenna system of claim 1, wherein a center point of a first receive patch is at a center point of a circle that passes through two adjacent transmit patches of the first plurality of transmit patches and two adjacent transmit patches of the second plurality of transmit patches.

4. The transmit and receive shared-aperture array antenna system of claim 1, further comprising:
    a first plurality of feed points for the first plurality of transmit patches;
    a second plurality of feed points for the plurality of receive patches; and
    a third plurality of feed points for the second plurality of transmit patches are arranged such that the antenna transmits and receives circularly-polarized or dual-polarized signals.

5. The transmit and receive shared-aperture array antenna system of claim 1, wherein an antenna beam is steerable in the second dimension by +/−30 degrees with less than a 3 dB loss.

6. A transmit and receive shared-aperture array antenna system, comprising:
    a reflector; and
    an antenna, comprising:
        a planar substrate;
        a first row of a first plurality of transmit patches arranged on the planar substrate;
        a second row of a plurality of receive patches arranged on the planar substrate; and
        a third row of a second plurality of transmit patches arranged on the planar substrate, wherein:
            the first row, second row, and third row are parallel;
            the second row is between the first row and the third row; and
            the plurality of receive patches are sized and positioned to optimally receive signals in K-band frequencies and the first plurality of transmit patches and the second plurality of transmit patches are sized and positioned to optimally transmit signals in Ka-band frequencies; and
            the first row and the third row use a sequential rotation feeding scheme and the second row uses a half sequential rotation feeding scheme.

7. A transmit and receive shared-aperture array antenna system, comprising:
    an antenna, comprising:
        a planar substrate;
        a first row of a first plurality of transmit patches arranged on the planar substrate;
        a second row of a plurality of receive patches arranged on the planar substrate, wherein the antenna includes eight receive elements or fewer; and
        a third row of a second plurality of transmit patches arranged on the planar substrate, wherein:
            the first row, second row, and third row are parallel;
            the second row is between the first row and the third row;
            a gain of the antenna with a cylindrical reflector is at least +20 dBi; and the antenna is incorporated as part of an IoT ground terminal that uses the antenna to communicate with a geosynchronous satellite.

8. The transmit and receive shared-aperture array antenna system of claim 7, wherein the cylindrical reflector is mechanically adjustable in a first dimension.

9. The transmit and receive shared-aperture array antenna system of claim 8, further comprising a phase shifter connected with the antenna such that a beam pattern is electronically steerable in a second dimension perpendicular to the first dimension.

10. The transmit and receive shared-aperture array antenna system of claim 7, wherein the antenna consists of a total of three rows, the three rows being the first row, the second row, and the third row.

11. A transmit and receive shared-aperture array antenna system, comprising:
    a cylindrical reflector;
    an antenna, comprising:
        a planar substrate;
        a first row of a first plurality of transmit patches arranged on the planar substrate;
        a second row of a plurality of receive patches arranged on the planar substrate; and
        a third row of a second plurality of transmit patches arranged on the planar substrate, wherein:
            the first row, second row, and third row are parallel;
            the second row is between the first row and the third row; and
            the first row and third row use a sequential rotation feeding scheme; and
    a phase shifter connected with the antenna such that a beam pattern is electronically steerable in a first dimension by +/−30 degrees with less than a 3 dB loss.

12. The transmit and receive shared-aperture array antenna system of claim 11, wherein the second row uses a half sequential rotation feeding scheme.

13. The transmit and receive shared-aperture array antenna system of claim 11, wherein the cylindrical reflector is mechanically adjustable in a second dimension.

14. The transmit and receive shared-aperture array antenna system of claim 13, wherein the beam pattern is electronically steerable in the first dimension perpendicular to the second dimension.

* * * * *